(12) United States Patent
Seo

(10) Patent No.: US 9,935,748 B2
(45) Date of Patent: Apr. 3, 2018

(54) METHOD FOR PROVIDING TRANSMISSION POWER IN WIRELESS COMMUNICATION SYSTEM AND APPARATUS FOR SAME

(71) Applicant: LG ELECTRONICS INC., Seoul (KR)

(72) Inventor: Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 14/377,979

(22) PCT Filed: Feb. 7, 2013

(86) PCT No.: PCT/KR2013/000990
§ 371 (c)(1),
(2) Date: Aug. 11, 2014

(87) PCT Pub. No.: WO2013/119052
PCT Pub. Date: Aug. 15, 2013

(65) Prior Publication Data
US 2015/0016376 A1    Jan. 15, 2015

Related U.S. Application Data

(60) Provisional application No. 61/597,179, filed on Feb. 10, 2012, provisional application No. 61/599,357, filed on Feb. 15, 2012, provisional application No. 61/604,527, filed on Feb. 29, 2012, provisional application No. 61/679,661, filed on Aug. 3, 2012.

(51) Int. Cl.
*H04W 4/00* (2009.01)
*H04L 5/00* (2006.01)
*H04W 72/04* (2009.01)
*H04L 1/18* (2006.01)
*H04W 52/04* (2009.01)

(52) U.S. Cl.
CPC .......... *H04L 5/0048* (2013.01); *H04L 1/1822* (2013.01); *H04W 52/04* (2013.01); *H04W 72/0406* (2013.01); *H04L 1/1861* (2013.01); *H04L 5/0035* (2013.01); *H04L 5/0092* (2013.01)

(58) Field of Classification Search
CPC ..... H04W 16/14; H04W 24/10; H04W 52/04; H04W 72/0406; H04W 84/045; H04W 52/16; H04W 72/042; H04L 1/1822; H04L 5/0048; H04L 25/0226; H04L 1/1861; H04L 5/005; H04L 5/0035; H04L 5/0092
USPC ................. 370/230, 252, 311, 329, 330, 336
See application file for complete search history.

(56) References Cited

U.S. PATENT DOCUMENTS

| | | |
|---|---|---|
| 2008/0081655 A1 | 4/2008 | Shin et al. |
| 2010/0120446 A1 | 5/2010 | Gaal |
| 2012/0028630 A1 | 2/2012 | Yamamoto et al. |

(Continued)

*Primary Examiner* — Harun Chowdhury
(74) *Attorney, Agent, or Firm* — Dentons US LLP

(57) ABSTRACT

In the present invention, disclosed is a method for a user equipment transreceiving signals with a network in a wireless communication system. More particularly, the method comprises the steps of: receiving a downlink control channel from the network; and either transmitting an uplink data channel to the network or receiving a downlink data channel from the network, depending on scheduling information included in the downlink control channel, wherein the scheduling information includes information with respect to a reference signal-to-downlink data channel power ratio.

4 Claims, 12 Drawing Sheets

(56) References Cited

U.S. PATENT DOCUMENTS

| | | | |
|---|---|---|---|
| 2012/0076017 A1* | 3/2012 | Luo | H04L 1/0027 370/252 |
| 2013/0114434 A1* | 5/2013 | Muruganathan | H04W 16/14 370/252 |
| 2013/0195045 A1* | 8/2013 | Papasakellariou | H04W 72/042 370/329 |
| 2013/0208604 A1* | 8/2013 | Lee | H04L 25/0226 370/252 |
| 2014/0086166 A1* | 3/2014 | Lindbom | H04W 52/16 370/329 |

* cited by examiner (a) CONTROL-PLANE PROTOCOL STACK (b) USER-PLANE PROTOCOL STACK

METHOD FOR PROVIDING TRANSMISSION POWER IN WIRELESS COMMUNICATION SYSTEM AND APPARATUS FOR SAME

This application is a 35 USC § 371 National Stage entry of International Application No. PCT/KR2013/000990, filed on Feb. 7, 2013, and claims priority to US Provisional Application Nos. 61/597,179, filed Feb. 10, 2012; 61/599,357 filed Feb. 15, 2012; 61/604,527 filed Feb. 29, 2012; and 61/679,661 filed Aug. 3, 2012, all of which are hereby incorporated by reference in their entireties as if fully set forth herein.

TECHNICAL FIELD

The present invention relates to a wireless communication system and, more particularly, to a method and apparatus for providing transmit power in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for providing transmit power in wireless communication system.

Technical Solution

The object of the present invention can be achieved by providing a method for, at a user equipment (UE), transmitting and receiving a signal to and from a network in a wireless communication system including receiving a downlink control channel from the network and performing one of transmission of an uplink data channel to the network or reception of a downlink data channel from the network according to scheduling information included in the downlink control channel, wherein the scheduling information includes information on a reference signal (RS)-to-downlink data channel power ratio.

Preferably, the method may further include receiving one or more RS-to-downlink data channel power ratio values from the network via a higher layer signal.

In this case, if the scheduling information is related to reception of the downlink data channel, the information on the RS-to-downlink data channel power ratio may include a field having a predetermined bit size and indicating an RS-to-downlink data channel power ratio value for receiving a downlink data channel from a serving cell of the network, among the one or more RS-to-downlink data channel power ratio values.

In addition, if the scheduling information is related to transmission of the uplink data channel, the information on the RS-to-downlink data channel power ratio may include a field having a predetermined bit size and indicating an RS-to-downlink data channel power ratio value of a downlink data channel to be assumed when reporting a channel state to a serving cell of the network, among the one or more RS-to-downlink data channel power ratio values.

Meanwhile, if the scheduling information is related to transmission of the uplink data channel, the information on the RS-to-downlink data channel power ratio may include a field having a predetermined bit size and indicating one of subframe sets for reporting a channel state report to a serving cell of the network, and, for each of the subframe sets, an RS-to-downlink data channel power ratio value of a downlink data channel to be assumed upon reporting a channel state may be predetermined via a higher layer signal.

More preferably, the information on the RS-to-downlink data channel power ratio may have the same bit size when the scheduling information is related to transmission of the uplink data channel and when the scheduling information is related to reception of the downlink data channel.

Further, the information on the RS-to-downlink data channel power ratio may be related to a reduced power almost blank subframe (r-ABS) in which transmit power of the downlink data channel is reduced.

In another aspect of the present invention, provided herein is a method for, at a network, transmitting and receiving a signal to and from a user equipment (UE) in a wireless communication system including transmitting a downlink control channel to the UE and performing one of reception of an uplink data channel from the UE or transmission of a downlink control channel to the UE according to scheduling information included in the downlink control channel, wherein the scheduling information includes information on a reference signal (RS)-to-downlink control channel power ratio.

Advantageous Effects

According to embodiments of the present invention, a base station can provide information on downlink transmit power to a user equipment (UE) in a wireless communication system. Accordingly, it is possible to efficiently mitigate inter-cell interference.

It will be appreciated by persons skilled in the art that that the effects that can be achieved through the present invention are not limited to what has been particularly described hereinabove and other advantages of the present invention will be more clearly understood from the following detailed description.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
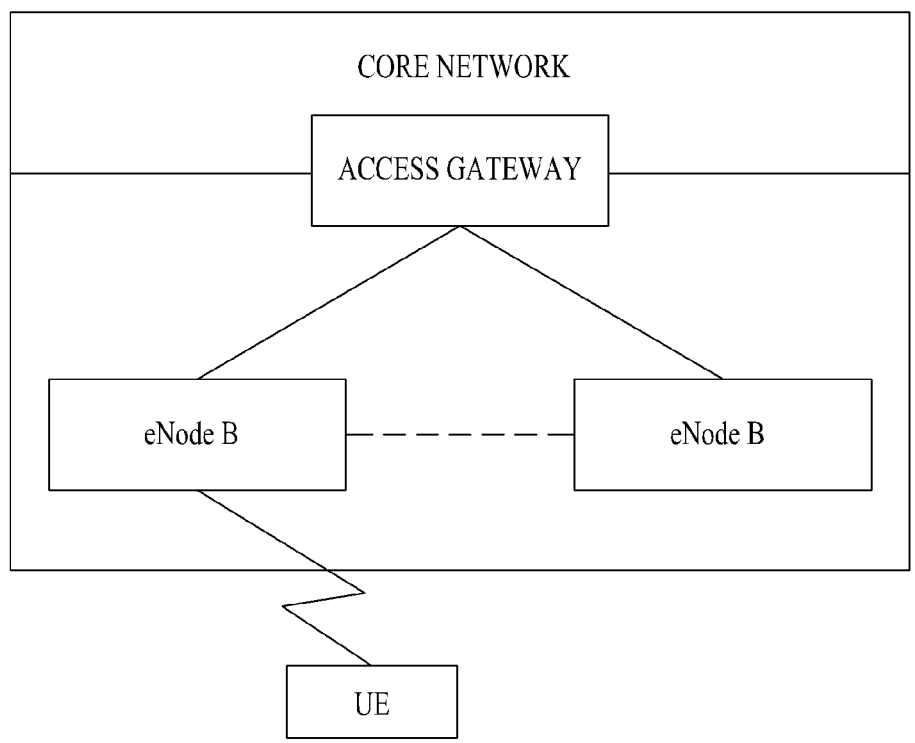
FIG. 1 is a diagram showing a network structure of an Evolved Universal Mobile Telecommunications System (E-UMTS) as an example of a wireless communication system.
Figure 2:
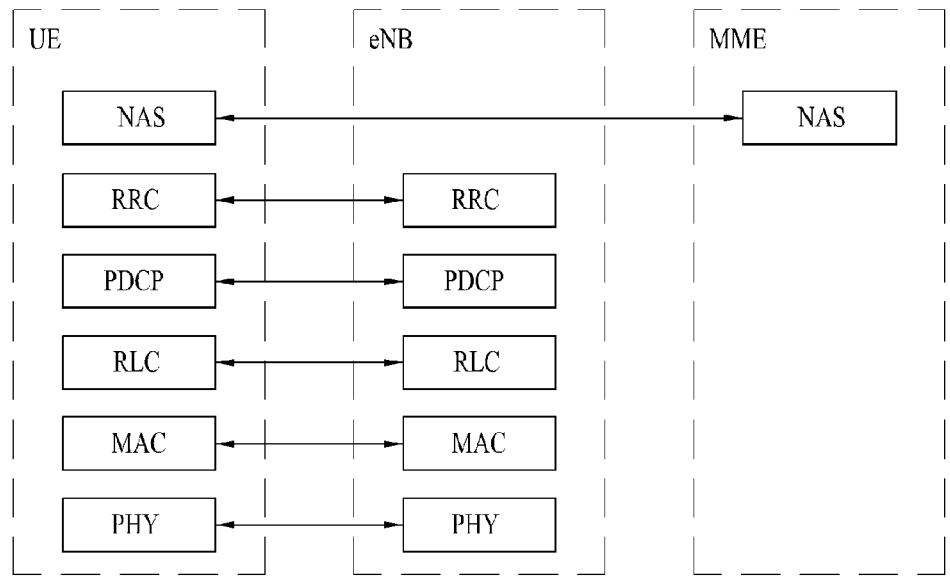
FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.
Figure 2:
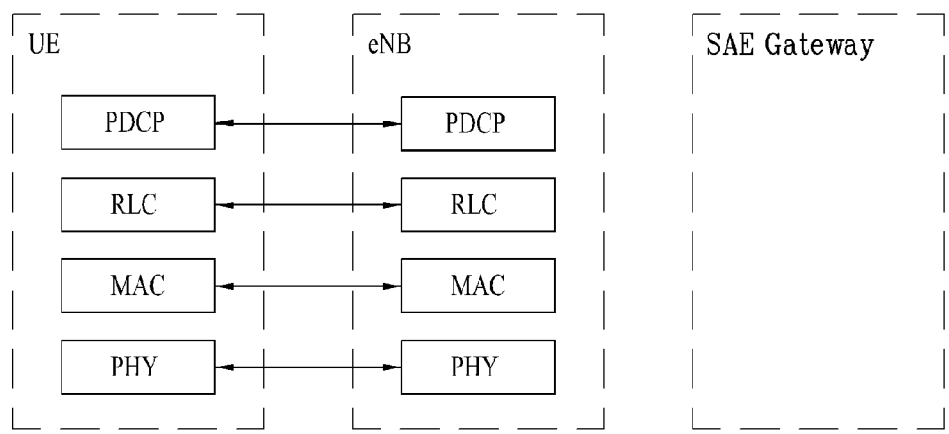

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
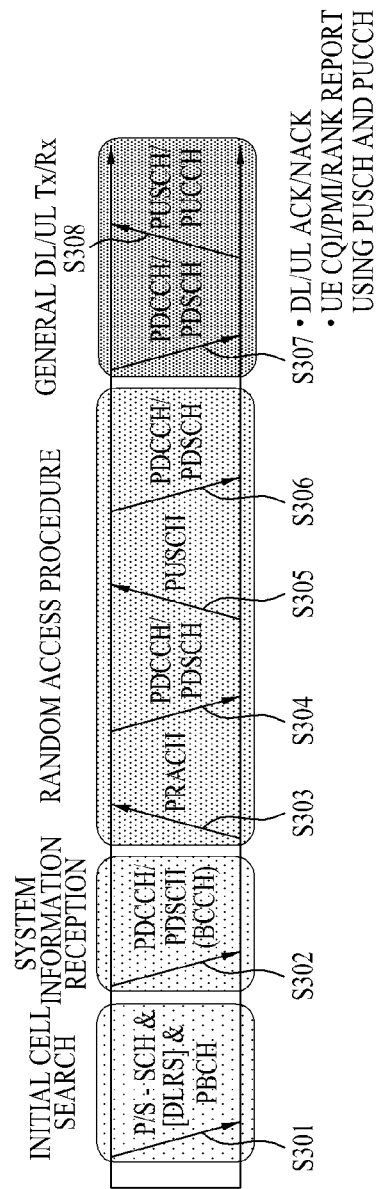
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
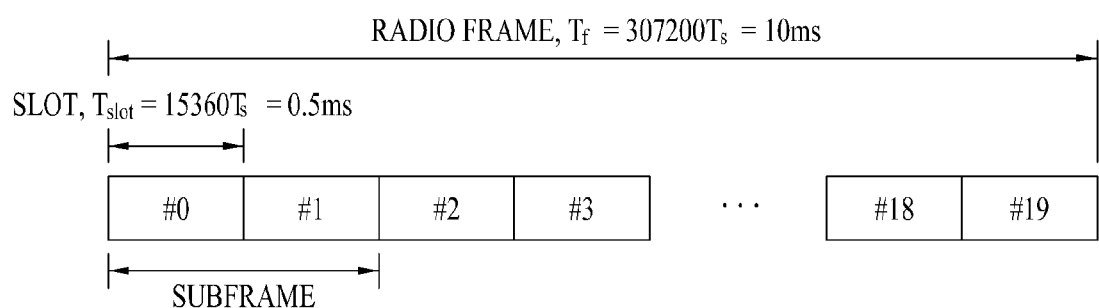
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
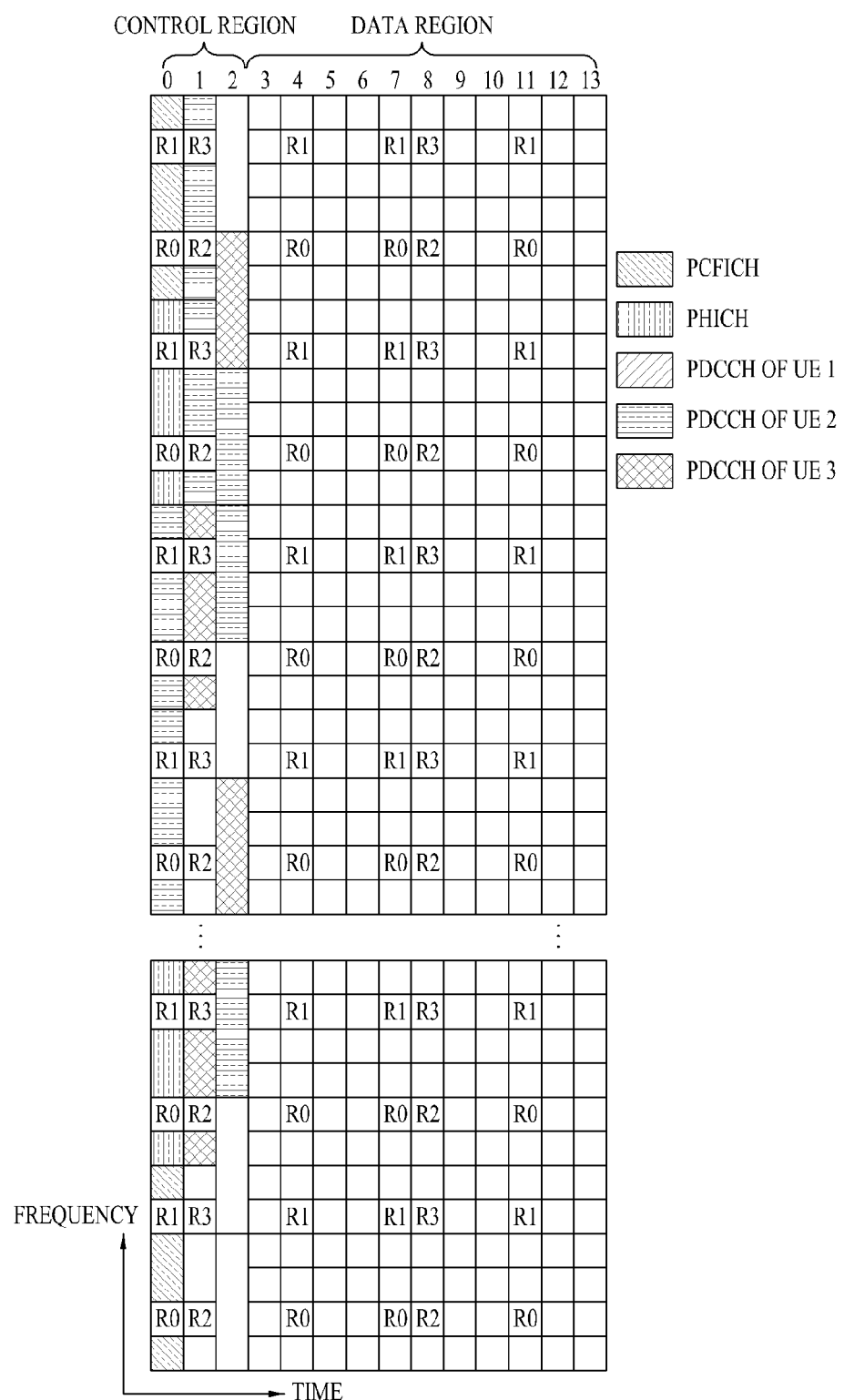
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
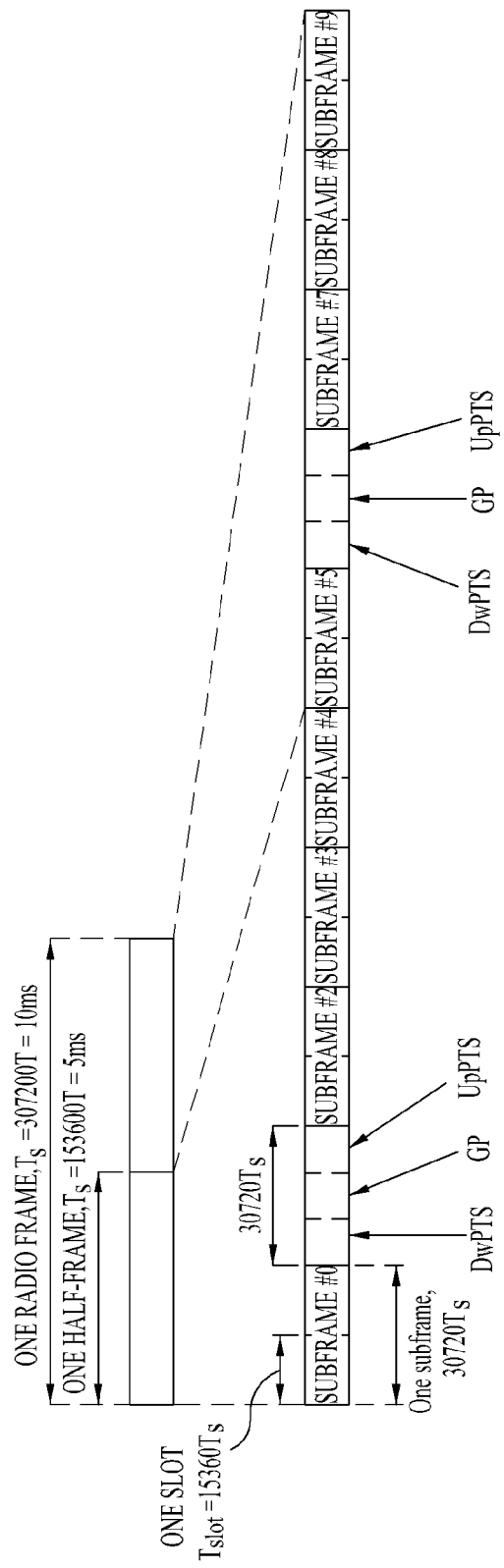
FIG. 6 is a diagram showing the structure of a radio frame used in an LTE TDD system.

FIG. 6 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink.

The special subframe is currently defined as shown in Table 1 below in the 3GPP standard. Table 1 shows the DwPTS and the UpPTS in case of $T_s=1/(15000\times 2048)$. The remaining region is configured as a guard period.

In the LTE TDD system, an uplink/downlink (UL/DL) configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D denotes a downlink subframe, U denotes an uplink subframe and S denotes the special subframe. Table 2 above shows a downlink-to-uplink switch-point periodicity in the UL/DL configuration in each system.

Now, a description of a Channel State Information (CSI) report is given. In the current LTE standard, there are an open-loop MIMO scheme operated without channel information and a closed-loop MIMO scheme operated based on channel information. Especially, according to the closed-loop MIMO system, each of the eNB and the UE may be able to perform beamforming based on CSI to obtain a multiplexing gain of MIMO antennas. To obtain CSI from the UE, the eNB transmits a reference signal and instructs the UE to feed back CSI measured based on the reference signal via a physical uplink control channel (PUCCH) or a physical uplink shared channel (PUSCH).

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, this may be generally fed back at a cycle longer than that of PMI or CQI.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

Meanwhile, in an LTE-A system which is a next-generation mobile communication system, in order to improve a data transfer rate, a Coordinated Multi Point (CoMP) transmission scheme which was not supported in the conventional standard will be supported. Here, the CoMP transmission scheme refers to a transmission scheme for performing communication with a UE by coordination between two or more eNBs or cells in order to improve communication performance between a UE located in a shadow region and an eNB (cell or sector).

The CoMP transmission scheme may be divided into a coordinated MIMO-based Joint Processing (JP) scheme through data sharing and a CoMP-Coordinated Scheduling/Coordinated Beamforming (CoMP-CS/CB) scheme.

In case of downlink, in the CoMP-JP scheme, a UE may instantaneously and simultaneously receive data from eNBs, each of which implements a CoMP transmission scheme, and combine the signals received from the eNBs so as to improve reception performance (Joint Transmission (JT)). In addition, a method of transmitting data from one of eNBs, each of which performs a CoMP transmission scheme, to a UE at a specific time may be considered (Dynamic Point Selection (DPS)). In the CoMP-CS/CB scheme, a UE may instantaneously receive data from one eNB, that is, a serving eNB, through beamforming.

In case of uplink, in the CoMP-JP scheme, eNBs may simultaneously receive a PUSCH signal from a UE (Joint Reception (JR)). In the CoMP-CS/CB scheme, only one eNB receives a PUSCH. At this time, a determination as to whether a CoMP/CS-CB scheme is used is made by coordinated cells (or eNBs). The CoMP scheme is applicable not only to a homogeneous network composed of macro eNBs only but also to a heterogeneous network.

Hereinafter, a PDSCH transmission mode will be described.

In the current 3GPP LTE standard and, more particularly, in the 3GPP TS 36.213, as shown in Tables 3 and 4 below, a downlink transmission mode is defined. In addition, the following transmission mode is configured with respect to a UE via higher layer signal, that is, RRC signaling.

TABLE 3

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna part, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |

TABLE 3-continued

| Transmission mode | DCI format | Transmission scheme of PDSCH corresponding to PDCCH |
|---|---|---|
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

TABLE 4

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Transmit diversity |
| Mode 4 | DCI format 1A | Transmit diversity |
|  | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
|  | DCI format 1 | Single-antenna port, port 5 |
| Mode 8 | DCI format 1A | Single-antenna port, port 7 |
|  | DCI format 2B | Single-antenna port, port 7 or 8 |
| Mode 9 | DCI format 1A | Single-antenna port, port 7 |
|  | DCI format 2C | Single-antenna port, port 7 or 8, |
| Mode 10 | DCI format 1A | Single-antenna port, port 7 |
|  | DCI format 2D | Single-antenna port, port 7 or 8, |

Referring to Tables 3 and 4, in the current 3GPP LTE standard, a downlink control information (DCI) format is defined according to the type of an RNTI masked to a PDCCH. In particular, in case of C-RNTI and SPS C-RNTI, a transmission mode, a DCI format corresponding thereto, that is, a transmission mode based DCI format, are shown. In addition, DCI format 1A for a fallback mode applicable regardless of transmission mode is defined. Table 3 shows the case in which the type of the RNTI masked to the PDCCH is a C-RNTI and Table 4 shows the case in which the type of the RNTI masked to the PDCCH is an SPS C-RNTI.

As an operation example of a transmission mode, if DCI format 1B is detected as a result of blind-decoding a PDCCH masked with a C-RNTI in Table 3 at a UE, a PDSCH is decoded on the assumption that a PDSCH is transmitted using a closed-loop spatial multiplexing scheme using a single layer.

In addition, in Tables 3 and 4, transmission mode 10 means a downlink data channel transmission mode of the above-described CoMP transmission scheme. For example, in Table 3, if DCI format 2D is detected as a result of blind-decoding a PDCCH masked with a C-RNTI at a UE, a PDSCH is decoded on the assumption that a PDSCH is transmitted using a multi-layer transmission scheme based on antenna ports 7 to 14, that is, DM-RSs. Alternatively, a PDSCH is decoded on the assumption that a PDSCH is transmitted using a single antenna transmission scheme based on DM-RS antenna port 7 or 8.

In contrast, if DCI format 1A is detected as a result of blind-decoding a PDCCH masked with a C-RNTI, the transmission mode is changed depending on whether the subframe is a MBSFN subframe. For example, if the subframe is a non-MBSFN subframe, a PDSCH is decoded on the assumption that a PDSCH is transmitted using a single antenna transmission scheme based on a CRS of antenna port 0 or a CRS based transmit diversity scheme. If the subframe is a MBSFN subframe, a PDSCH may be decoded on the assumption that single antenna transmission based on a DM-RS of antenna port 7 is performed.

Hereinafter, energy per resource element (EPRE) will be described for power assignment of downlink resources.

A reference value of the EPRE is EPRE for a CRS and the CRS EPRE is determined by a higher layer signal and has a fixed value within a downlink system band and a subframe. EPRE for a PDSCH via which actual data is transmitted may be expressed by a ratio of CRS EPREs. For example, a ratio of CRS EPRE to PDSCH EPRE in an OFDM symbol in which a CRS is present is defined by $\rho_A$ and a ratio of CRS EPRE to PDSCH EPRE in an OFDM symbol in which a CRS is not present is defined by $\rho_B$.

Figure 7:
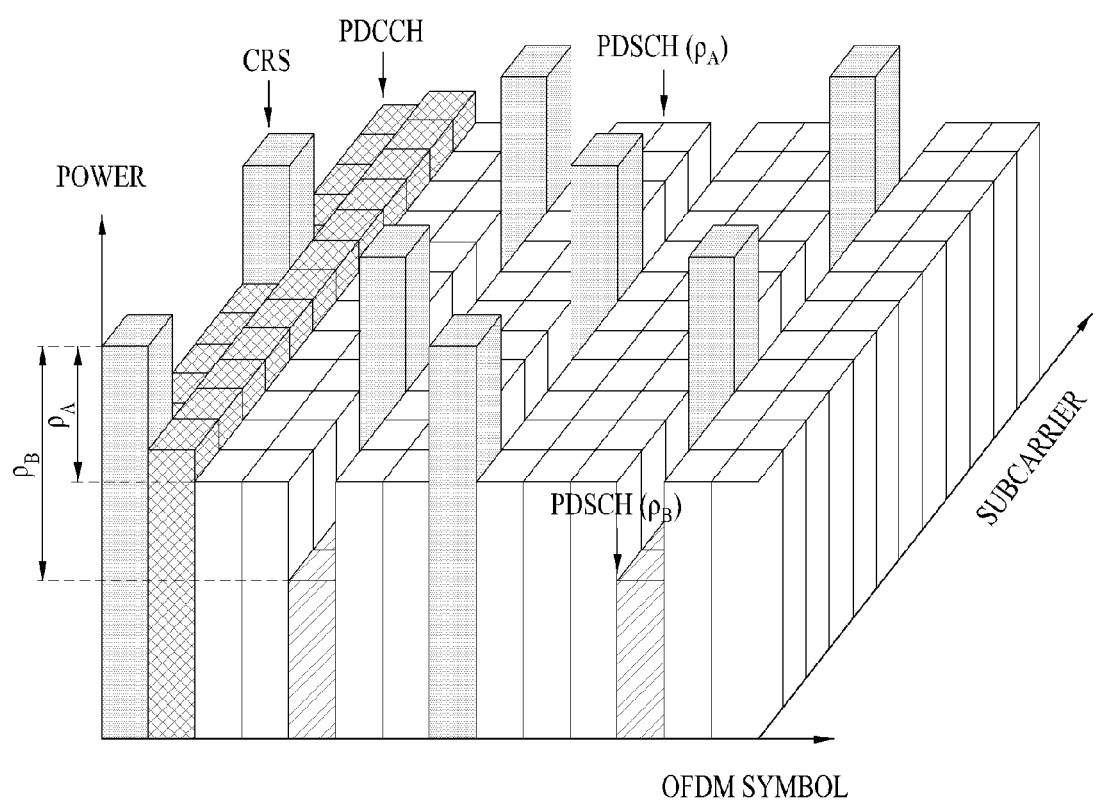
FIG. 7 is a diagram showing a CRS energy per resource element (EPRE)-to-PDSCH EPRE ratio in an LTE system.

FIG. 7 is a diagram showing a CRS EPRE-to-PDSCH EPRE ratio in an LTE system. In particular, in FIG. 7, a lateral axis denotes an OFDM symbol, a longitudinal axis denotes a subcarrier and a vertical axis denotes power.

Referring to FIG. 7, $\rho_A$ is determined by a power offset $\delta_{power-offset}$ depending on whether multi-user multiple input multiple output (MU-MIMO) is applied and a UE-specific variable $P_A$ and $\rho_B/\rho_A$ is determined by the number of antenna ports and a cell-specific variable $P_B$.

A UE configured to receive a PDSCH using a CRS demodulates a PDSCH using a CRS EPRE-to-PDSCH EPRE ratio. In addition, when a UE reports CSI, the UE calculates receive power of a CRS and then reports, to an eNB, RI/PMI/CQI calculated on the assumption that a PDSCH is transmitted with power calculated with a CRS EPRE-to-PDSCH EPRE ratio. If CSI is configured to be calculated using a CSI-RS, an eNB notifies a UE of a CSI-RS EPRE-to-PDSCH EPRE ratio and enables the UE to calculate RI/PMI/CQI according to a similar method. Hereinafter, for convenience of description, a CRS EPRE-to-PDSCH EPRE ratio or a CSI-RS EPRE-to-PDSCH EPRE ratio is referred to as an RS-to-PDSCH power ratio.

Meanwhile, in an LTE system, an almost blank subframe (ABS) is proposed as an interference mitigation method for solving an interference problem in a heterogeneous environment. The ABS may have a zero power almost blank subframe (z-ABS) structure in which a reference signal (e.g., a CRS) for existing UEs and system information (e.g., PBCH, SIB, PSS or SSS) are transmitted and the other data is not transmitted or a reduced power almost blank subframe (r-ABS) structure in which data is transmitted with very low transmit power.

First Embodiment

When an eNB transmits a PDSCH to a UE using an r-ABS, PDSCH transmit power is reduced and thus an RS-to-PDSCH power ratio different from that of a non-ABS in which transmit power is not reduced is used. When a PDSCH is received using an r-ABS, if the PDSCH is modulated with a high modulation order such as 16QAM or 64QAM, an accurate power level of a received signal should be known for accurate modulation. The UE should know which RS-to-PDSCH power ratio applies to a PDSCH received in a specific subframe.

Thus, the eNB preferably includes information or an indicator regarding the RS-to-PDSCH power ratio of a PDSCH scheduled by DCI in the DCI for scheduling the PDSCH. For example, the eNB may predefine RS-to-PDSCH power ratios which will apply to a non-ABS and an r-ABS via a higher layer signal such as an RRC signal and includes the above-described indicator in DCI whenever the PDSCH is transmitted, thereby specifying an RS-to-PDSCH power ratio used for the PDSCH.

Among DCI formats of a current LTE system, DCI format 1A for scheduling a PDSCH and DCI format 0 for scheduling a PUSCH always have the same length, such that a UE does not perform separate blind decoding when decoding two DCI. Accordingly, if RS-to-PDSCH power ratio information having a size of N bits is added to DCI format 1A for scheduling a PDSCH, N bits are also added to DCI format 0 for scheduling a PUSCH.

In the present invention, if an N-bit RS-to-PDSCH power ratio is added to DCI for scheduling a PDSCH, N bits added to DCI for scheduling a PUSCH defined to have the same length as the DCI for scheduling the PDSCH are used to indicate an RS-to-PDSCH power ratio assumed upon CSI feedback.

That is, DCI for scheduling a PUSCH may include an aperiodic CSI report request field and the aperiodic CSI report request field is used to indicate whether an eNB enables a UE to report CSI or which CSI is reported. As described above, if an r-ABS and a non-ABS are mixed, different CSI values are calculated according to subframe type. Accordingly, the UE may determine the subframe type of CSI required by the eNB using information on an N-bit size added to DCI for scheduling a PUSCH.

Accordingly, the indicator indicating the RS-to-PDSCH power ratio is commonly necessary for DCI for scheduling a PDSCH and DCI for scheduling a PUSCH. If such an indicator is commonly added to both DCI, the same length may be maintained as in DCI format 1A (DCI for scheduling a PDSCH) and DCI format 0 (DCI for scheduling a PUSCH) and, as a result, the number of times of blind decoding of the UE can be reduced.

More specifically, the eNB pre-sets K RS-to-PDSCH power ratios with respect to the UE using a higher layer signal and adds an N-bit field to both DCI format 1A and DCI format 0. Here, the N-bit field is used to select one of RS-to-PDSCH power ratios delivered in advance. When the UE receives DCI format 1A, a PDSCH is demodulated using a power ratio indicated by an indicator included in the DCI.

In contrast, DCI format 0 is detected and, if an aperiodic CSI report is triggered in DCI format 0, CSI is calculated using a power ratio indicated by the N-bit field and is reported using a PUSCH. If the CSI report is not triggered, the N-bit field is unnecessary and thus may be fixed to a specific value in advance.

For example, if the CSI report is not triggered, the N-bit field indicating the RS-to-PDSCH power ratio may be set to 0. In this case, the UE may determine that DCI detection is incorrect upon receiving the N-bit field, some bits of which are 1.

The above-described operation is applicable to other DCI for scheduling a PDSCH or PUSCH other than DCI format 1A and DCI format 0.

Meanwhile, if the N-bit field is added to DCI for scheduling a PUSCH in order to indicate the above-described RS-to-PDSCH power ratio, the N-bit field is used to indicate that a plurality of CSI calculated using a plurality of power ratios is reported simultaneously. For example, if a 1-bit field is added, this may be combined with a 1-bit CSI report request field present in DCI for scheduling a PUSCH to form an indicator having a total size of 2 bits, which may be interpreted as shown in Table 5 below.

TABLE 5

| | |
|---|---|
| 00 | No CSI report |
| 01 | CSI report with power ratio setting 1 |
| 10 | CSI report with power ratio setting 1 |
| 11 | CSI report with power ratio setting 1 and setting 2 |

In Table 5, if CSI is indicated to be reported using two RS-to-PDSCH settings, the eNB assigns a sufficient amount of PUSCH resources to the UE such that two CSI are reported.

From the viewpoint of an interfered cell, such RS-to-PDSCH power ratio signaling may be required upon CSI calculation. For example, if a UE of an interfered cell first measures RS power of an interfering cell and checks how much power is required to transmit a PDSCH in each subframe as compared to the measured value, it is possible to measure and report CSI corresponding thereto.

Accordingly, in order to maintain a common signaling format in an interfering cell and an interfered cell, first, a UE of the interfering cell interprets the added field as the RS-to-PDSCH power ratio of a serving cell and uses the added field to calculate power of the serving cell, thereby calculating CSI. In contrast, a UE of the interfered cell interprets the added field as the RS-to-PDSCH power ratio of a neighbor cell, that is, the interfering cell, and uses the added field to calculate power of an interfering cell, thereby calculating CSI.

Although the RS-to-PDSCH power ratio to be used to calculate CSI may be directly indicated using the added N-bit field in order to indicate the RS-to-PDSCH power ratio, the power ratio may be indirectly indicated via a CSI measurement subset indicator.

For example, the eNB may divide a subframe set into subset 1 and subset 2 via a higher layer signal such as RRC in advance and assign an RS-to-PDSCH power ratio to be used to calculate CSI to each subset in advance. In this case, the eNB may trigger a CSI report using a desired RS-to-PDSCH power ratio at a corresponding time via a CSI measurement subset indicator included in DCI for scheduling a PUSCH. Here, subset 1 and subset 2 may be divided into subframes having more interference influence and subframes having less interference influence or r-ABSs and non-ABSs.

If the RS-to-PDSCH power ratio is indirectly indicated using the CSI measurement subset indicator, the CSI measurement subset concept may be introduced due to change in interference from the interfering cell even when the RS-to-PDSCH power ratio is not actually changed. That is, since CSI is changed according to a difference in RS-to-PDSCH power ratio between the non-ABS and the r-ABS, the UE of the interfering cell should calculate a plurality of CSI. In contrast, the UE of the interfered cell uses a fixed RS-to-PDSCH power ratio and calculates a plurality of CSI due to interference change.

Accordingly, the RS-to-PDSCH power ratio value needs to be signaled per subframe for accurate demodulation from the viewpoint of the UE of the interfering cell but the power ratio for demodulation does not need to be signaled per subframe from the viewpoint of the interfered cell. This means that how the N-bit field added to DCI for scheduling a PDSCH is used is changed depending on whether the serving cell of the UE is an interfering cell or an interfered cell.

From the viewpoint of the interfering cell, the N-bit field added to DCI format 1A is preferably used as an indicator indicating a power ratio between an RS and a PDSCH scheduled by DCI format 1A. Of course, such an indicator is preferably included in other DCI for scheduling a PDSCH.

In contrast, from the viewpoint of the interfered cell, since the RS-to-PDSCH power ratio of the serving cell does not need to be changed, the N-bit field added to DCI format 1A may be not regarded as being used for a special purpose. Accordingly, from the viewpoint of the interfered cell, the N-bit field added to DCI format 1A is preferably fixed to a specific value to reduce a detection failure probability.

In addition to DCI format 1A, since an additional field is preferably not included in other DCI for scheduling a PDSCH, if RS-to-PDSCH power ratio information or a CSI measurement subset indicator is included in DCI format for scheduling a PUSCH via a higher layer signal such as RRC in advance, the eNB may indicate whether an additional power ratio indicator is included in DCI format for scheduling a PDSCH (or is fixed to a specific value in case of DCI format 1A).

Alternatively, from the viewpoint of the interfered cell, the added N-bit field may be used to indicate the power ratio of the neighbor cell. If this method is applied, the UE may estimate an interference power level of each resource element. For example, the UE first measures RS power of the interfering cell and then estimates PDSCH power of the interfering cell from the signaled power ratio. In addition, a resource element interfering with the RS of the interfering cell and a resource element interfering with the PDSCH of the interfering cell are differently weighted to perform optimal decoding.

If a field indicating the above-described RS-to-PDSCH power ratio is added to DCI, the following operations may be combined.

1) A field for an RS-to-PDSCH power ratio of a serving cell applied to a PDSCH is inserted into DCI for scheduling a PDSCH and a field for an RS-to-PDSCH power ratio of a serving cell to be used to calculate CSI is inserted into DCI for scheduling a PUSCH. If a CSI report request is not triggered in DCI for scheduling a PUSCH, the added field may be regarded as an insignificant value.

2) A field for an RS-to-PDSCH power ratio of a serving cell applied to a PDSCH is inserted into DCI for scheduling a PDSCH and a field for a CSI measurement subset is inserted into DCI for scheduling a PUSCH. The RS-to-PDSCH power ratio may be pre-assigned to each CSI measurement subset.

3) A field for a CSI measurement subset is inserted into DCI for scheduling a PUSCH and a field inserted into DCI for scheduling a PDSCH is regarded as being insignificant.

4) A field for a CSI measurement subset is inserted into DCI for scheduling a PUSCH and a field inserted into DCI for scheduling a PDSCH is used to indicate an RS-to-PDSCH power ratio of a neighbor cell.

Among the operations of 1) to 4), 1) and 2) are suitable as the operation of the interfering cell and 3) and 4) are suitable as the operation of the interfered cell.

An operation for adding an N-bit indicator to the above-described DCI may be limited to only the case in which a search space in which a UE blind-decodes DCI is a UE-specific search space (USS).

In a common search space (CSS) in which several UEs blind-decode DCI together, since system information or paging information simultaneously received by several UEs is transmitted, DCI format 1A or DCI format 0 should maintain the same bit size as system information or paging information in order to prevent blind decoding complexity from being increased.

Accordingly, if DCI format 1A or DCI format 0 is transmitted in the CSS, a power ratio or a CSI measurement subset should be determined without an additional field. A power ratio or CSI measurement subset having high priority is selected from among a plurality of power ratios or CSI measurement subsets and a related operation may be performed using the selected RS-to-PDSCH power ratio or CSI measurement subset if a PDSCH is scheduled or a CSI report is triggered by DCI detected in the CSS. This will now be described in greater detail.

A) RS-to-PDSCH power ratio: When the eNB signals a plurality of power ratios to a serving cell and a neighbor cell, priority is assigned to each power ratio value and a value having highest priority is used for a PDSCH scheduled by DCI detected in the CSS with the RS-to-PDSCH power ratio of the serving cell and/or the RS-to-PDSCH power ratio of the interfering cell. Similarly, even when CSI is measured based on the RS-to-PDSCH power ratio, the RS-to-PDSCH power ratio value having highest priority is applied to the CSI report triggered by DCI detected in the CSS.

B) CSI measurement subset: If the eNB sets a plurality of CSI measurement subsets, priority is assigned to the CSI measurement subsets and CSI for a CSI measurement subset having highest priority is reported in a CSI report triggered by DCI detected in the CSS. Alternatively, as CSI reference resources (that is, a subframe for calculating CSI), a subframe in which DCI for triggering CSI is transmitted (or a subframe set including that subframe) is set to calculate CSI.

If it is difficult to assign priority to a CSI measurement subset, the UE may calculate CSI of a subframe configured to perform radio resource management (RRM)/radio link monitoring (RLM) of a serving cell, because the subframe configured to perform RRM/RLM may more stably operate as compared to a subframe configured to measure CSI due to relatively tiny change in set configuration.

If a CSI measurement subset to be measured by a UE is determined, the UE may assume that CSI reference resources have been moved to a closest subframe belonging to the subset (that is, regard a subframe which does not belonging to the CSI measurement subset as being not valid CSI reference resources) and calculate CSI. This is efficient in that CSI reference resources may be clearly specified even when DCI for triggering aperiodic CSI is not present in a subset in which CSI is measured.

The above-described RS-to-PDSCH power ratio may be indicated along with an RE mapping pattern with which the UE receives the PDSCH. Such an RE mapping pattern may be given for the purpose of indicating the position of a CRS RE of a neighbor cell, in order to enable the neighbor cell to transmit a PDSCH instead of a serving cell. For example, if predetermined indicator bits are added to DCI to indicate a specific state, the UE demodulates the PDSCH using an RS-to-PDSCH power ratio and PDSCH RE mapping pattern linked to the state. At this time, an RS-to-PDSCH power ratio having highest priority (that is, an RS-to-PDSCH power ratio used when DCI is detected from a CSS and a field indicating an RS-to-PDSCH power ratio is not present in the detected DCI) may be determined using the following method.

a) An RS-to-PDSCH power ratio broadcast by the eNB via system information may be set as an RS-to-PDSCH power ratio having highest priority. In this case, other RS-to-PDSCH power ratios of the serving cell or neighbor cells may be signaled via UE-specific signaling.

b) An RS-to-PDSCH power ratio linked to a field having a predetermined value may be set as an RS-to-PDSCH power ratio having highest priority. For example, an RS-to-PDSCH power ratio linked to a field having a value of 0 may be set as an RS-to-PDSCH power ratio having highest priority. Alternatively, if the state indicated by the field having the value of 0 is linked with a pattern for mapping a PDSCH on the assumption that there is no CRS and thus RS-to-PDSCH power ratio information is insignificant, an RS-to-PDSCH power ratio linked to a next state may be used.

c) An RS-to-PDSCH power ratio linked to a specific PDSCH RE mapping pattern may be set as an RS-to-PDSCH power ratio having highest priority. For example, if only CRS of a serving cell is avoided and a mapping pattern of a PDSCH is present, an RS-to-PDSCH power ratio linked thereto may be set as an RS-to-PDSCH power ratio having highest priority.

Second Embodiment

As described above, if an indicator indicating an RS-to-PDSCH power ratio is added to DCI, a bit size of the DCI is increased. However, if this indicator is appropriately combined with an existing field of the DCI, it is possible to add the indicator indicating the RS-to-PDSCH power ratio without increasing the bit size of the DCI.

As an example of an existing field, there is a HARQ ID indication field in a TDD system. In an LTE TDD system, a 4-bit HARQ ID indication field is included in DCI for scheduling a PDSCH and is used to indicate to which HARQ ID each PDSCH belongs. Table 6 below shows the maximum number of HARQ processes according to a UL/DL configuration defined in an LTE TDD system.

TABLE 6

| TDD UL/DL configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |

Referring to Table 6 above, the maximum number of HARQ processes used in the LTE TDD system is changed according to UL/DL configuration and is less than the number of states, that is, 16, which is expressed by 4 bits. As a result, some states of the HARQ ID indication field become unused reserved states. For example, in case of UL/DL configuration 0, since a maximum of four HARQ processes is used, four of 16 states are used to indicate the HARQ ID and the remaining 12 states are not used.

Accordingly, in the second embodiment of the present invention, in order to prevent overhead from being increased due to addition of an indicator indicating an RS-to-PDSCH power ratio to DCI, the indicator indicating the RS-to-PDSCH power ratio may be jointly encoded with the HARQ ID indication field.

For example, in case of UL/DL configurations 0 and 6, since the maximum number of HARQ processes is less than 8, the RS-to-PDSCH power ratios for all HARQ processes may be indicated using the reserved states. For example, in case of UL/DL configuration 0, four of 16 states expressed by HARQ ID are used to indicate the HARQ ID having an RS-to-PDSCH power ratio value of 1 and four of the remaining states are used to indicate the HARQ ID having an RS-to-PDSCH power ratio value of 2. The remaining 8 states may be reserved states.

Figure 8:
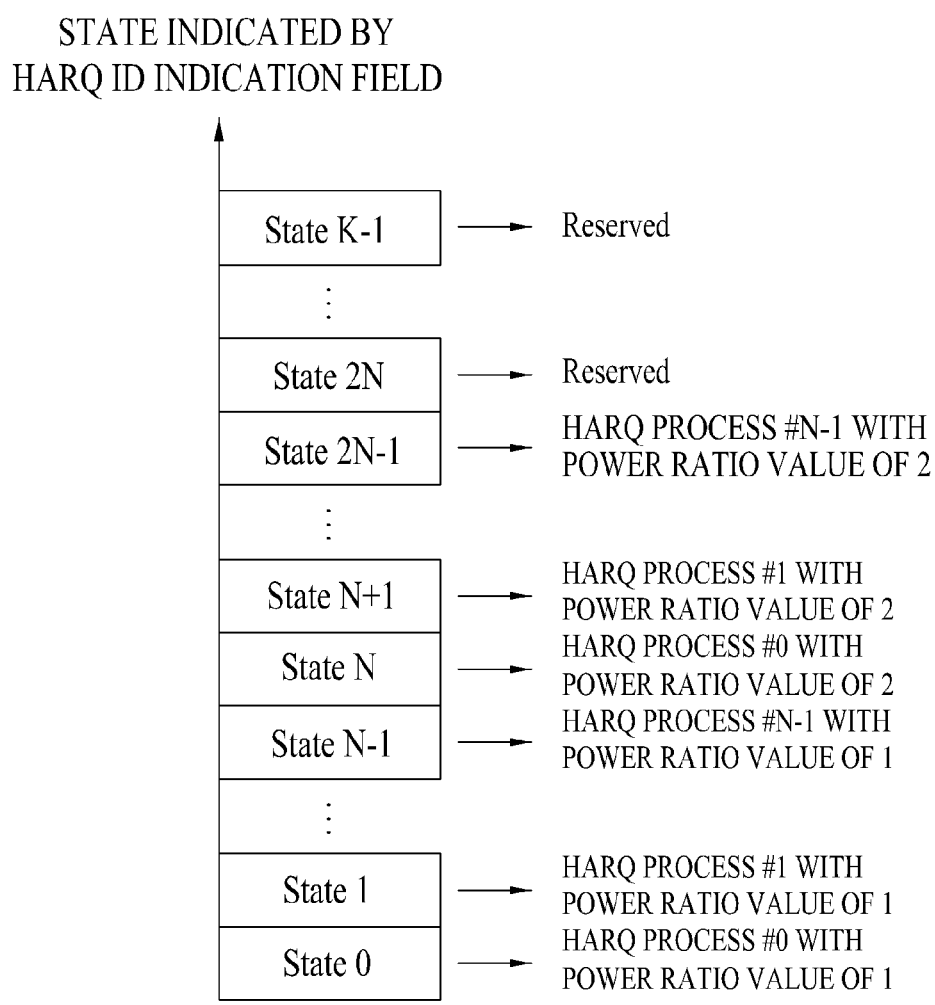
FIG. 8 is a diagram showing an example of joint encoding RS-to-PDSCH power ratio information with HARQ ID information according to a second embodiment of the present invention.

FIG. 8 is a diagram showing an example of joint encoding RS-to-PDSCH power ratio information with HARQ ID information according to a second embodiment of the present invention.

Referring to FIG. 8, assume that a HARQ ID indication field has a total of K states, the maximum number of HARQ processes is N and the number of necessary power ratio values is two. In this case, N states of K states expressed by the HARQ ID are used to indicate the HARQ ID having an RS-to-PDSCH power ratio value of 1 and N states of the remaining states are used to indicate the HARQ ID having an RS-to-PDSCH power ratio value of 0. The remaining (k−2N) states may be reserved states.

The two RS-to-PDSCH power ratio values may not be assigned to all HARQ processes. For example, in case of UL/DL configurations 2, 3, 4 and 5, since the maximum number of HARQ processes is greater than 8, the number of reserved states is less than the number of HARQ processes. At this time, some HARQ processes may be assigned a plurality of RS-to-PDSCH power ratio values to dynamically convert non-ABSs and r-ABSs and the remaining processes may be assigned only one RS-to-PDSCH power ratio.

Figure 9:
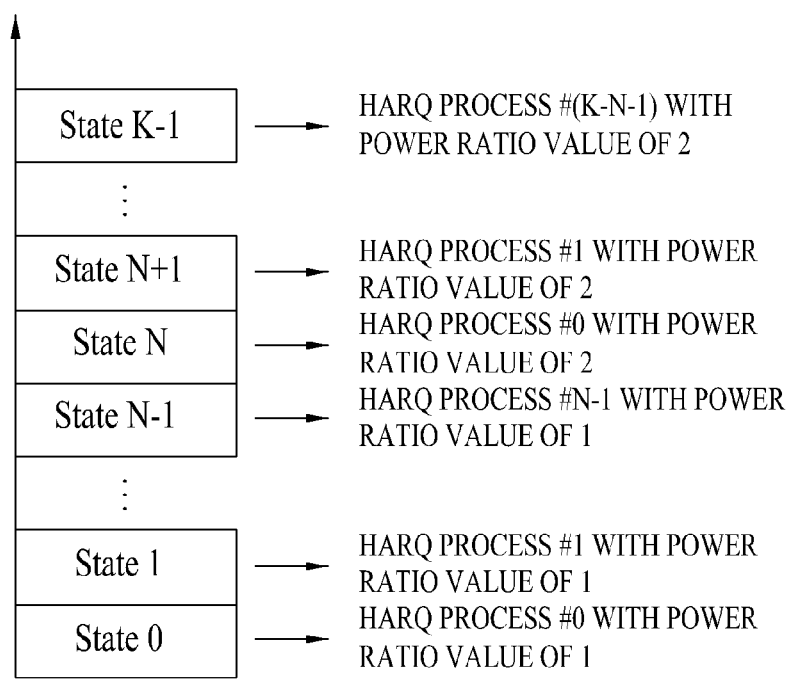
FIG. 9 is a diagram showing another example of jointly encoding RS-to-PDSCH power ratio information with HARQ ID information according to the second embodiment of the present invention.

FIG. 9 is a diagram showing another example of jointly encoding RS-to-PDSCH power ratio information with HARQ ID information according to the second embodiment of the present invention. Similarly, in FIG. 9, assume that a HARQ ID indication field has a total of K states, the maximum number of HARQ processes is N and the number of necessary power ratio values is two.

Referring to FIG. 9, two RS-to-PDSCH power ratio values may be assigned to HARQ processes #0 to #(K−N−1) using two states but only the RS-to-PDSCH power ratio value 1 may be assigned to HARQ processes #(K−N) to #(N−1). That is, the RS-to-PDSCH power ratio value is 1 or 2 in HARQ processes #0 to #(K−N−1) but the RS-to-PDSCH power ratio value is 1 in HARQ processes #(K−N) to #(N−1).

Further, the HARQ processes to which one RS-to-PDSCH power ratio value is assigned are assigned different HARQ process values to effectively perform scheduling of non-ABSs and r-ABSs.

Figure 10:
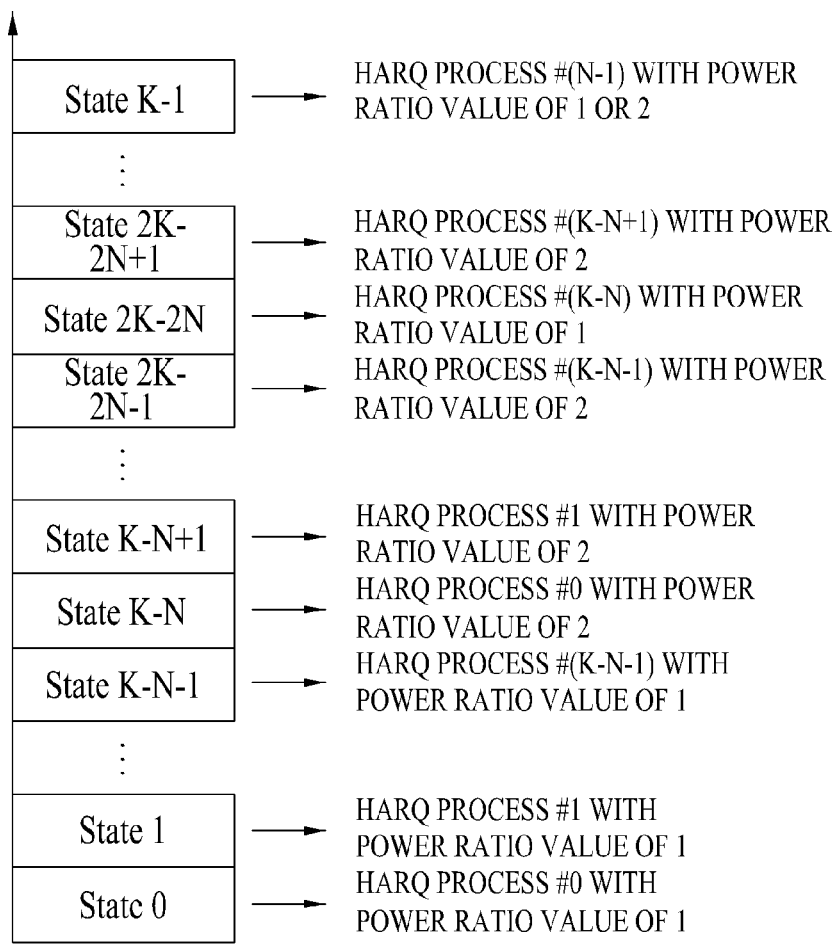
FIG. 10 is a diagram showing another example of jointly encoding RS-to-PDSCH power ratio information with HARQ ID information according to the second embodiment of the present invention.

FIG. 10 is a diagram showing another example of jointly encoding RS-to-PDSCH power ratio information with HARQ ID information according to the second embodiment of the present invention.

Referring to FIG. 10, HARQ processes #0 to #(K−N−1) are assigned RS-to-PDSCH power ratio values of 1 and 2 as two states and the remaining HARQ processes are alternatively assigned the RS-to-PDSCH power ratio value of 1 and the RS-to-PDSCH power ratio value of 2.

Third Embodiment

In a third embodiment of the present invention, a HARQ operation when a non-ABS and an r-ABS are mixed and a soft buffer management method related thereto will be described. Assume that an eNB notifies a UE of a set of HARQ processes assigned to the non-ABS and the r-ABS via a higher layer signal such as RRC in advance and notifies the UE of RS-to-PDSCH power ratio values to be used for the non-ABS and the r-ABS.

A HARQ ID indication field, to which the PDSCH belongs, is present in DCI for scheduling a PDSCH. The eNB configures a HARQ ID indication field to use the HARQ process assigned to the non-ABS in a subframe used as the non-ABS (that is, a subframe for transmitting the PDSCH without transmit power restriction) and instructs a UE to perform demodulation using an RS-to-PDSCH power ratio suitable therefor.

The eNB configures a HARQ ID indication field to use the HARQ process assigned to the r-ABS in a subframe used as the r-ABS (that is, a subframe in which PDSCH transmit power is reduced) and instructs the UE to perform demodulation using an RS-to-PDSCH power ratio suitable therefor. Via this process, the eNB may dynamically indicate the RS-to-PDSCH power ratio to be used in every subframe.

Figure 11:
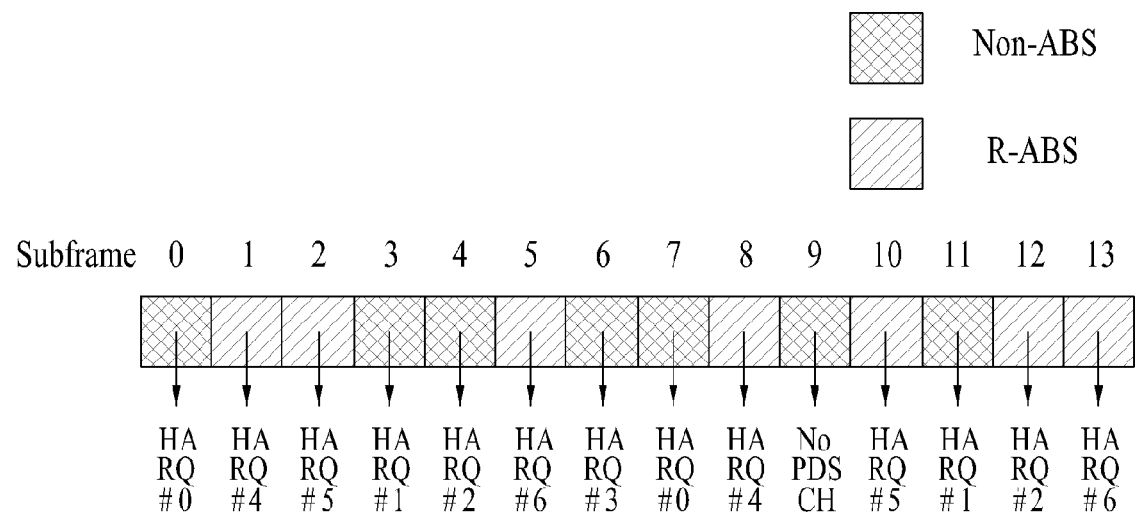
FIG. 11 is a diagram showing an example of a HARQ ID indication field according to a third embodiment of the present invention.

FIG. 11 is a diagram showing an example of a HARQ ID indication field according to a third embodiment of the present invention. In particular, FIG. 11 shows the case in which four processes (that is, HARQ processes 0, 1, 2 and 3) of a total of eight HARQ processes are assigned to non-ABS s and the remaining four HARQ processes (that is, the HARQ processes 4, 5, 6 and 7) are assigned to r-ABSs.

Referring to FIG. 11, subframe #9 is assigned as non-ABS but a PDSCH is not transmitted to the UE because there is no data to be transmitted to the UE which receives the PDSCH. In this case, since the PDSCH is not transmitted, the RS-to-PDSCH power ratio value becomes unnecessary. In addition, in subframe #12, an r-ABS is used but HARQ process 2 assigned to a non-ABS is used.

If the type of a pre-assigned subframe and the type of a subframe for transmitting an actual PDSCH are changed when a specific HARQ process is used, since the RS-to-PDSCH power ratio used by the eNB and the RS-to-PDSCH power ratio assumed by the UE for demodulation are different, a problem may occur.

However, such a problem can be solved if information on the amplitude of a signal uses a modulation scheme which is not used to deliver information, that is, a QPSK scheme, upon PDSCH transmission. This is because different RS-to-PDSCH power ratios do not influence phase information of the transmitted signal and thus different RS-to-PDSCH power ratios are not problematic in the QPSK scheme for delivering information using phase only. If a modulation scheme in which information is carried using phase is appropriately used, each HARQ process may be used even in a subframe, in which an RS-to-PDSCH power ratio different from a pre-assigned RS-to-PDSCH power ratio is used, and thus flexible PDSCH scheduling is achieved.

As described above, if the non-ABS and the r-ABS are mixed, there is a need for a method for effectively managing a soft buffer used for a HARQ operation at a UE. The UE uses a soft buffer having a predetermined size for a HARQ operation of a PDSCH. This soft buffer is used to store information on a PDSCH, modulation of which has failed, and to combine the PDSCH with a retransmitted PDSCH in the HARQ process so as to increase a demodulation success probability. In general, the UE equally divides the soft buffer according to the number of HARQ processes and assigns a buffer space having the same size to each process.

However, since transmit power of the PDSCH is reduced in the r-ABS, a modulation order is likely to be reduced as compared to the non-ABS (the modulation order is reduced from 64QAM to 16QAM) and transmit rank is also likely to be reduced (for example, from rank 4 to rank 2). Accordingly, the size of the PDSCH which may be transmitted (that is, the size of information bits included in the PDSCH) in the r-ABS is reduced as compared to the non-ABS. This means that a soft buffer having a smaller size may be used in the r-ABS.

The eNB may notify the UE of the size of a soft buffer to be occupied by each HARQ process through a higher layer signal such as RRC in advance and assign a soft buffer having a larger size to a HARQ process used for the non-ABS as necessary. Here, the size of the soft buffer occupied by each HARQ process may be expressed as a ratio of the size of the soft buffer occupied by each HARQ process to a total soft buffer size. The UE, which has received the size of the soft buffer, may separately manage a buffer for storing the PDSCH received in a HARQ process or subframe to which the r-ABS is applied and a buffer for storing a PDSCH received in a HARQ process or subframe to which the non-ABS is applied. As a result, a buffer having a larger size may be assigned to the non-ABS. This means that peak throughput in the non-ABS may be increased.

In addition, the eNB may notify the UE of a maximum modulation order or rank, which may be used in the r-ABS, in advance via a higher layer signal such as RRC. If the UE, which has received the maximum modulation order or rank, receives DCI to which an abnormally high order or rank applies in a subframe or HARQ process to which the r-ABS applies, the UE may be aware of errors occurring in the DCI. As a result, it is possible to prevent the UE from incorrectly determining that DCI which is not actually delivered by the UE is detected and to prevent incorrect operation.

Figure 12:
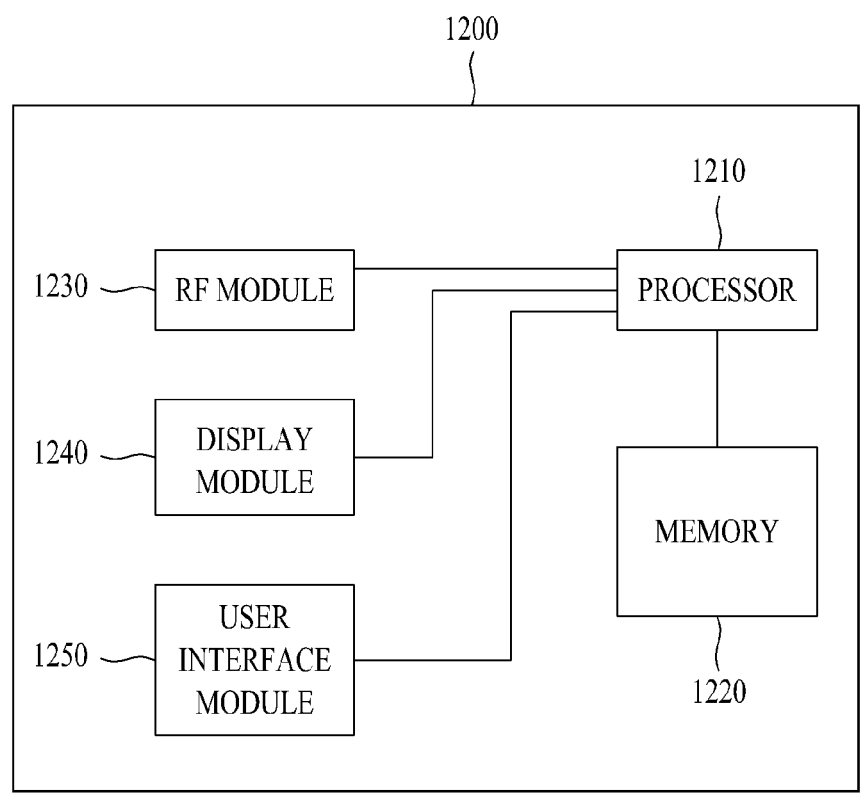
FIG. 12 is a block diagram of a communication apparatus according to one embodiment of the present invention.

FIG. 12 is a block diagram of a communication apparatus according to one embodiment of the present invention.

Referring to FIG. 12, a communication apparatus 1200 includes a processor 1210, a memory 1220, a Radio Frequency (RF) module 1230, a display module 1240 and a user interface module 1250.

The communication apparatus 1200 is shown for convenience of description and some modules thereof may be omitted. In addition, the communication apparatus 1200 may further include necessary modules. In addition, some modules of the communication apparatus 1100 may be subdivided. The processor 1210 is configured to perform an operation of the embodiment of the present invention described with reference to the drawings. For a detailed description of the operation of the processor 1210, reference may be made to the description associated with FIGS. 1 to 11.

The memory 1120 is connected to the processor 1210 so as to store an operating system, an application, program code, data and the like. The RF module 1230 is connected to the processor 1210 so as to perform a function for converting a baseband signal into a radio signal or converting a radio signal into a baseband signal. The RF module 1230 performs analog conversion, amplification, filtering and frequency up-conversion or inverse processes thereof. The display module 1240 is connected to the processor 1210 so as to display a variety of information. As the display module 1240, although not limited thereto, a well-known device such as a Liquid Crystal Display (LCD), a Light Emitting Diode (LED), or an Organic Light Emitting Diode (OLED) may be used. The user interface module 1250 is connected to the processor 1210 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting and receiving a signal, by a user equipment (UE), to and from a network, in a wireless communication system, the method comprising:
    receiving a downlink control information (DCI) including a bit field indicating a reference signal (RS)-to-downlink (DL) data channel power ratio from the network;
    checking whether the DCI schedules a DL data channel or an uplink (UL) data channel;
    demodulating the DL data channel by using the RS-to-DL data channel power ratio when the DCI schedules the DL data channel; and
    transmitting the UL data channel including a channel state information (CSI) which is calculated by using the RS-to-DL data channel power ratio when the DCI schedules the UL data channel and the DCI triggers an aperiodic CSI report,
    wherein, when the UE is a UE of an interfering cell, the bit field indicates a RS-to-DL data channel power ratio of a serving cell, and the UL data channel includes a CSI of the serving cell calculated using the RS-to-DL data channel power ratio of the serving cell, wherein, when the UE is a UE of an interfered cell, the bit field indicates a RS-to-DL data channel power ratio of a neighbor cell, and the UL data channel includes a CSI of the neighbor cell calculated using the RS-to-DL data channel power ratio of the neighbor cell, wherein, when the DCI schedules the UL data channel and the DCI does not trigger the aperiodic CSI report, checking whether detection of the DCI is correct or not, by comparing the bit field with a predetermined value.

2. The method according to claim 1, wherein the bit field is related to a reduced power almost blank subframe (r-ABS) in which transmit power of the DL data channel is reduced.

3. A method for transmitting and receiving a signal, by network, to and from user equipment (UE), in a wireless communication system, the method comprising:

transmitting a downlink control information (DCI) including a bit field indicating a reference signal (RS)-to-downlink (DL) data channel power ratio to the UE;

transmitting a DL data channel by using the RS-to-DL data channel power ratio when the DCI schedules the DL data channel; and receiving an uplink (UL) data channel including a channel state information (CSI) which is calculated by using the RS-to-DL data channel power ratio when the DCI schedules the UL data channel and the DCI triggers an aperiodic CSI report, wherein, when the UE is a UE of an interfering cell, the bit field indicates a RS-to-DL data channel power ratio of a serving cell, and the UL data channel includes a CSI of the serving cell calculated using the RS-to-DL data channel power ratio of the serving cell, wherein, when the UE is a UE of an interfered cell, the bit field indicates a RS-to-DL data channel power ratio of a neighbor cell, and the UL data channel includes a CSI of the neighbor cell calculated using the RS-to-DL data channel power ratio of the neighbor cell, wherein, when the DCI schedules the UL data channel and the DCI does not trigger the aperiodic CSI report, the UE checks whether detection of the DCI is correct or not, by comparing the bit field with a predetermined value.

4. The method according to claim 3, wherein the bit field is related to a reduced power almost blank subframe (r-ABS) in which transmit power of the DL data channel is reduced.

\* \* \* \* \*